United States Patent
Park

(10) Patent No.: US 8,046,483 B2
(45) Date of Patent: Oct. 25, 2011

(54) APPARATUS AND METHOD FOR PROVIDING PAUSE FUNCTION OF BROADCASTING STREAMING IN TERMINAL

(75) Inventor: Seong-Jun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 881 days.

(21) Appl. No.: 11/322,280

(22) Filed: Dec. 29, 2005

(65) Prior Publication Data

US 2006/0146854 A1    Jul. 6, 2006

(30) Foreign Application Priority Data

Dec. 30, 2004    (KR) ................. 10-2004-0116953

(51) Int. Cl.
*G06F 15/16*    (2006.01)
*H04Q 7/20*    (2006.01)

(52) U.S. Cl. .............. 709/231; 709/219; 455/414.1; 455/550.1; 455/466

(58) Field of Classification Search ............ 709/231, 709/100, 225; 455/550.1, 414.1, 466, 566, 455/3.04, 3.06; 725/89, 134, 142
See application file for complete search history.

(56) References Cited

U.S. PATENT DOCUMENTS

| | | | |
|---|---|---|---|
| 5,633,841 A * | 5/1997 | Yokota et al. | 369/30.23 |
| 5,659,653 A | 8/1997 | Diehl et al. | |
| 5,914,676 A * | 6/1999 | Akpa | 341/23 |
| 6,588,015 B1 * | 7/2003 | Eyer et al. | 725/89 |
| 6,901,067 B1 * | 5/2005 | Kalavade | 370/352 |
| 7,305,695 B1 * | 12/2007 | Ramakesavan | 725/88 |
| 2002/0032776 A1 * | 3/2002 | Hasegawa et al. | 709/225 |
| 2002/0057891 A1 * | 5/2002 | Shigaki | 386/1 |
| 2002/0138831 A1 * | 9/2002 | Wachtfogel et al. | 725/32 |
| 2003/0070182 A1 | 4/2003 | Pierre et al. | |
| 2003/0097659 A1 | 5/2003 | Goldman | |
| 2004/0177378 A1 | 9/2004 | Cool | |
| 2004/0204020 A1 * | 10/2004 | Kuramitsu | 455/550.1 |
| 2005/0070327 A1 * | 3/2005 | Watanabe | 455/552.1 |
| 2005/0120377 A1 * | 6/2005 | Carlucci et al. | 725/90 |
| 2005/0245240 A1 * | 11/2005 | Balasuriya et al. | 455/414.1 |
| 2006/0020961 A1 * | 1/2006 | Chiu | 725/32 |

FOREIGN PATENT DOCUMENTS

| | | |
|---|---|---|
| EP | 0255107 | 2/1998 |
| EP | 1176820 | 1/2002 |
| WO | 02/003682 | 10/2002 |
| WO | 03/019945 | 3/2003 |
| WO | WO-03/019945 A | 3/2003 |
| WO | 03/061280 | 7/2003 |

* cited by examiner

*Primary Examiner* — Wing Chan
*Assistant Examiner* — Ruolei Zong
(74) *Attorney, Agent, or Firm* — Lee, Hong, Degerman, Kang & Waimey

(57) ABSTRACT

An apparatus and method for providing a pause function of a broadcasting streaming in a terminal are disclosed. A player of the terminal includes a temporary storage buffer. When a key for a pause of broadcasting streaming is inputted, reproducing of streaming is suspended and broadcasting streaming packet data is continuously received from a network and temporarily stored in the temporary storage buffer. When a pause release key is inputted, the broadcasting streaming packet data starts to be reproduced starting from a time point of the pause. Thus, a pause function is provided for a streaming service of broadcasting content whose reproducing rate cannot be controlled by a user.

29 Claims, 4 Drawing Sheets

APPARATUS AND METHOD FOR PROVIDING PAUSE FUNCTION OF BROADCASTING STREAMING IN TERMINAL

CROSS REFERENCE TO RELATED APPLICATION

Pursuant to 35 U.S.C. §119(a), this application claims the benefit of earlier filing date and right of priority to Korean Application No. 10-2004-0116953, filed Dec. 30, 2004, the contents of which are hereby incorporated by reference herein in their entirety.

BACKGROUND OF THE INVENTION

1. Field of the Invention

The present invention relates to an apparatus and method for providing a pause function for a broadcast streaming service of a terminal.

2. Description of the Related Art

In general, a streaming service is a multimedia service that multimedia data is not stored in a storage unit of a terminal but reproduced (played) and then erased. The streamlining service is widely used in a fixed line communication network, and it can be favorably employed for a mobile communication terminal such as a mobile phone which does not have a sufficient storage space.

Techniques for implementing video streaming are divided into an image compression algorithm, a voice compression algorithm and a wireless/wired network protocol.

A video format used in the current wired/wireless system using a video compression technique includes an MPEG (Moving Picture Experts Group) group format, such as MPEG1, MPEG2, MPEG4, or the like, designated by the international ISO/IEC standards committee, and an H.26x group format such as H.261, H.263, H.264, of the like, designated by the international ITU-T standards committee.

In particular, in a wireless environment with a mobile communication terminal, the MPEG4 or the H.263 is gaining ground as applicable international standards, and the 3GPP ($3^{rd}$ Generation Partnership Project) and 3GPP2 standards committees, the international wireless mobile communication standards organization, have adopted the MPEG4 format as the standard used for VOD (Video On Demand; user definition video viewing service) technology and the H.263 format as the standard user for video telephony (VT). According to the development of the compression techniques and the picture quality enhancement techniques, the demand for the H.264 format is increasing to the level of the MPEG-4 and the H.263 formats.

As examples of voice compression algorithms, a wired/wireless voice compression algorithm such as an MIDI (Musical Instrument Digital Interface), an MP3 (MPEG Audio Layer-3) or an AAC (Advanced Audio Coding), a QCELP (Qualcomm™ Code Excited Linear Prediction), an EVRC (Enhanced Variable Rate Coder), and the like, which are suitable for the wireless environment are typically used, and demands for an AAC+ are increasing in line with the development of compression techniques and voice quality enhancement techniques.

The wired/wireless network protocols include a TCP (Transmission Control Protocol), which has a low transmission rate but high transmission reliability, and a UDP (User Datagram Protocol) which has a high transmission rate but low transmission reliability. Especially, in the wireless environment in which the network rate is low and a packet loss occurs frequently, an RTP (Real-time Transport Protocol) and an RTCP (RTP Control Protocol) suitable as a real time protocol having advantages of the TCP and the UDP are being gradually adopted as standards, and in order to adaptively cope with real time services, an RTSP (Real-Time Streaming Protocol) and an SDP (Service Discovery Protocol) are also widely used.

To sum up, it can be said that in order to implement the video streaming service in the mobile communication terminal, MPEG4, H.263 and H.265 are commonly used as the image data formats, the AAC and the AAC+ are commonly used as the voice data formats, and the RTP, the RTCP, the RTSP and the SDP are commonly used as the transmission protocol formats.

FIG. 1 is a view showing the construction of a general system for providing a multimedia broadcasting streaming service to a mobile communication terminal. The general multimedia broadcasting streaming service system includes a video camera 60 for generating analog multimedia broadcasting data; a VOD encoder 50 for converting the generated analog multimedia broadcasting data into digital media data; a streaming server 40 for generating RTP/RTCP packets according to a wireless streaming transmission protocol by using the converted digital media data; a transmitter 30 for transmitting the RTP/RTCP packets; a base station 20 for transmitting the RTP/RTCP packets which have been transmitted through the transmitted 30 to a mobile communication terminal 10 through wireless communication; and the mobile communication terminal 10 for reproducing the received RTP/RTCP packets received through the base station 20 into a broadcasting streaming.

The general multimedia broadcasting streaming service system constructed as described above operates in the following manner.

When the mobile communication terminal 10 requests a certain broadcasting content, such as a sports broadcast, real time news (i.e., live news broadcasts), a talk show, or the like, the streaming server 40 transmits the requested broadcasting content to the mobile communication terminal 10.

When the mobile communication terminal 10 requests real time news, the analog multimedia broadcasting data of the news program is provided to the VOD encoder 50 by a video broadcast camera 60, and the VOD encoder 50 converts the analog multimedia broadcasting data into digital media data by using an MPEG encoding program or an H.265 encoding program. The converted digital media data is provided to the streaming server 40 and the streaming server 40 converts the digital media data into the RTP/RTCP packets and transmits them to the base station 20 through the transmitter 30. The base station 20 transmits the RTP/RTCP packet type digital media data to the mobile communication terminal 10, which then receives the digital media data and provides a real time news broadcast to the user through the streaming service.

While the mobile communication terminal is being provided with a streaming service based upon contents downloaded to the terminal or the VOD contents whose rate can be arbitrarily adjusted by the user, if a situation occurs where the streamlining service needs to be suspended for certain reasons of the user, such as when the user receives an incoming voice call and performs voice call communication through the mobile communication terminal, generally, the mobile communication terminal can briefly stop reproduction of the content for a certain amount of time by using a pause function.

However, while the mobile communication terminal is providing broadcasting content whose reproduction rate cannot be adjusted by the user, such as live broadcast contents or pre-recorded broadcast contents being provided as the streaming service to the user, if the broadcasting streaming service needs to be temporarily stopped by the user, the user cannot receive some portion of the broadcasting content during the time that the streaming service was paused.

BRIEF DESCRIPTION OF THE INVENTION

Therefore, an object of the present invention is to provide an apparatus and method for providing a pause function of a broadcasting streaming service of a terminal.

To achieve at least the above objects in whole or in parts, there is provided a method for providing a pause function of a broadcasting streaming service of a terminal, comprising: when a pause key is inputted, suspending reproducing and temporarily storing broadcasting streaming packet data transmitted from a streaming server; and when a pause release key is inputted, reproducing the temporarily stored broadcasting streaming packet data starting from a time point of the pause.

To achieve at least these advantages in whole or in parts, there is further provided an apparatus for providing a pause function of a broadcasting streaming of a terminal including: a network interface unit for receiving broadcasting streaming packet data from a streaming server through a wireless network; a user input interface unit for receiving a key for a pause of a broadcasting streaming; and a streaming player for suspending reproducing, receiving the broadcasting streaming packet data through the network interface unit and temporarily storing it when a pause key is inputted, and reproducing the temporarily stored broadcasting streaming packet data starting from the time point of the pause when a pause release key is inputted.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

Figure 1:
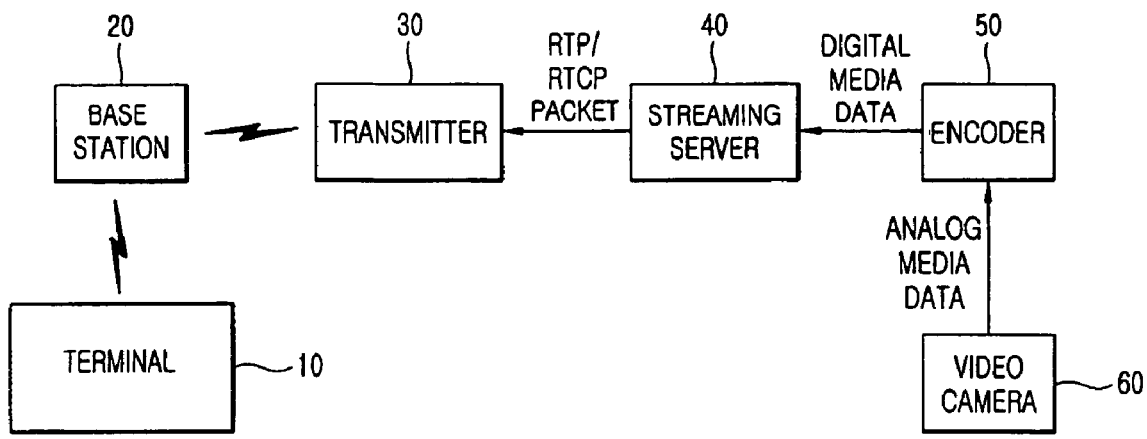
FIG. 1 is a schematic block diagram showing the exemplary construction of a general system for providing a multimedia broadcasting streaming service to a terminal.

In the present invention, a terminal provides a pause function for a broadcasting streaming such that while a broadcasting streaming service is being provided, when it is temporarily suspended (stopped or paused) by a user, packet data of broadcasting content are continuously received and stored. Thereafter, when the pause state is released, reproducing of the packet data of the broadcasting content is resumed starting from the time point of the pause.

In order to implement a multimedia service in the terminal, particularly, in a mobile communication terminal, the multimedia service needs to be designed in with consideration of various operating system (OS) characteristics of the mobile communication terminal.

Unlike a general server computer or a personal computer, the mobile communication terminal is an embedded system for which limited resources and real time characteristics are considered to be important. Thus, the OS of the mobile communication terminal is operated based on an RTOS (Real Time Operating System) considering real time performance, unlike other operating systems such as Windows®, UNIX® and LINUX®. Currently, the term RTOS refers to an OS of relatively small size used for an embedded system, rather than an OS used for a real time system.

In general, in case of a CDMA mobile communication terminal, an RTOS called REX® manufactured by Qualcomm™ is typically used, and for an advanced mobile communication terminal, an RTOS such as Nucles®, Embedded Linux®, WinCE®, or the like can be used.

The RTOS has characteristics of managing a task schedule using priority and performs a function such as allocating appropriate CPU processing time to tasks that manage various functions of a real time system.

Thus, in order to suitably provide a service in the terminal, particularly in the mobile communication terminal, context switching must be smoothly performed through task management.

In general, task states used for the OS(Operating System) include a ready state, a wait state, a running state, and the like. The ready state refers to a state in which a task is ready in preparation of being used later. The wait state refers to a state in which the task has handed over its control rights for running of a different task after the task is actually used. The running state refers to a state in which the task actually performs an operation. In addition, there can be several other task states such as a suspend state, a dormant state, and the like, which, however, are not considered in detail herein.

In order to apply the technique of the present invention to the terminal, a multimedia player task, a user interface (UI) task, a network task, a system call task may be provided. The multimedia player task may perform overall controlling of multimedia data for an actual play. The multimedia player task may discriminate a type of media of received data, and may provide commands for decoding, displaying or the like. The UI task may perform a function such as receiving key inputs, content selection of the user, or the like. The network task may receive a streaming packet from the streaming server. The system call task may check whether a voice call is received. Besides, there can be some other tasks required for the play, which, however, are not mentioned in detail herein.

Figure 2:
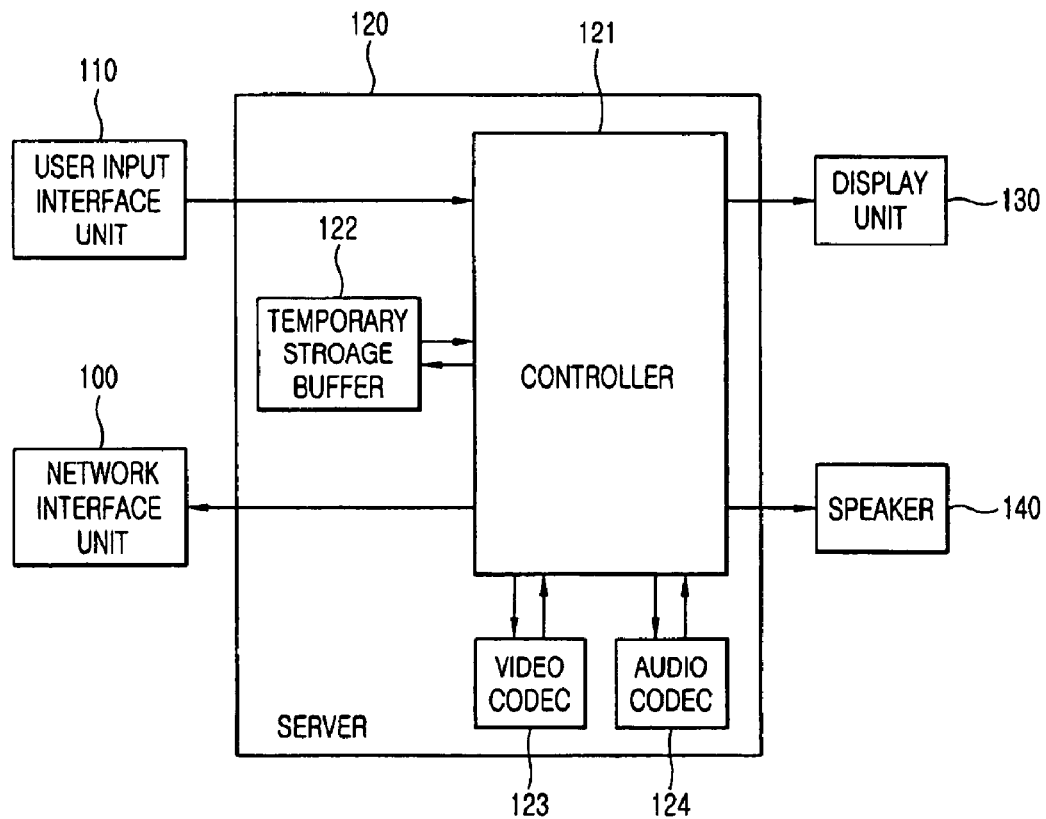
FIG. 2 is a schematic block diagram showing the exemplary construction of an apparatus for providing a pause function of a broadcasting streaming of a terminal in accordance with the present invention.

FIG. 2 is a schematic block diagram showing the exemplary construction of an apparatus for providing a pause function of a broadcasting streaming of a terminal in accordance with the present invention.

The apparatus for providing a pause function of a broadcasting streaming of a terminal in accordance with the present invention may include a network interface unit 100 for performing a wireless interface with a network; a user input interface unit 110 for receiving a key input by a user; a player 120 for suspending reproducing streaming packet data and temporarily storing broadcasting streaming packet data received through the network interface unit 100 when a function (e.g., key) for pausing the streamlining service is inputted through the user input interface unit 110, and decoding the temporarily stored broadcasting streaming packet data and performing the reproducing the decoded broadcasting streaming packet data when a function (e.g., key) for releasing the pause is inputted; a display unit 130 that is controlled by the player 120 for displaying the decoded video data; and a speaker 140 that is controlled by the player 120 for outputting the decoded audio data.

The player 120 may include a main player controller 121 for generally controlling the reproduction and pause functions of the broadcasting streaming packet data received through the network interface unit 100; a temporary storage buffer 122 for temporarily storing the broadcasting streaming packet data received through the network interface unit 100 that is controlled by the controller 121; a video CODEC 123 that is controlled by the controller 121 for decoding video data of the broadcasting streaming packet data; and an audio CODEC 124 that is controlled by the controller 121 for decoding audio data of the broadcasting streaming packet data.

The controller 121 controls an OS (Operating System) in a memory and the OS performs context switching among the multimedia player task, the network task, the UI task, the system call task. The OS may be an RTOS.

Figure 3:
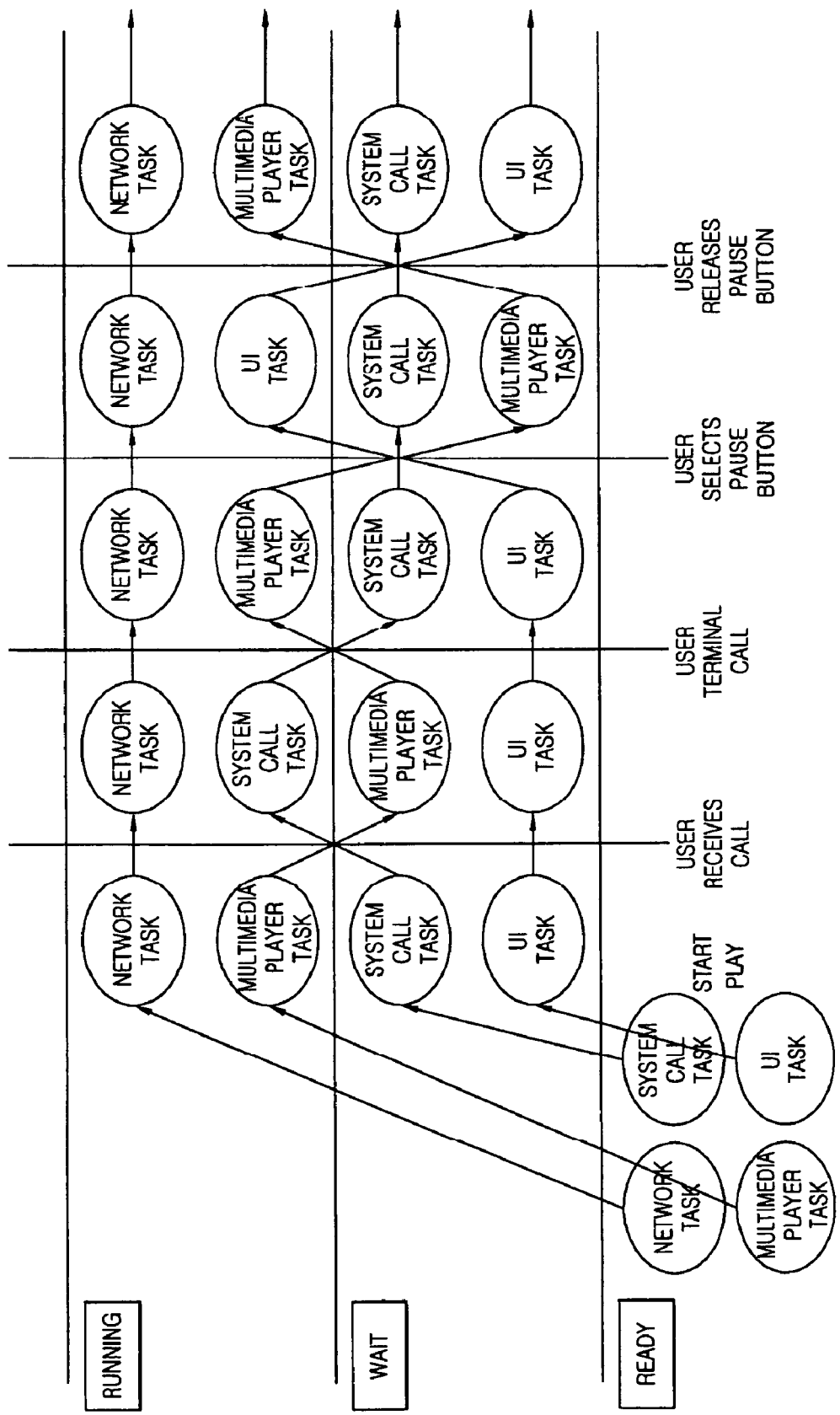
FIG. 3 is a view showing exemplary state transition of tasks for performing a pause function of the multimedia broadcasting streaming in accordance with the present invention.

FIG. 3 is a view showing exemplary state transition of tasks for performing a pause function of the multimedia broadcasting streaming in accordance with the present invention.

With the multimedia player task, the network task, the UI task and the system call task in a ready state, when the play (reproduction) begins, the multimedia player task and the network task are transited to a running state and the system call task and the UI task are transited to a wait state. Accordingly, the network task receives the broadcasting streaming packet data through the network interface unit 100, and the multimedia player task discriminates a type of media of the received streaming packet data, instructs the decoding of video and audio components of the streaming packet data, and also instructs the outputting of the decoded video and audio data.

While the broadcasting streaming packet data received from the network is being played, the system call task checks whether an incoming communication (e.g., voice call, text or multimedia message, etc.) is received by the terminal and the UI task checks whether a function (e.g., a key input) for pausing the streaming service is inputted.

When an incoming communication (i.e., call) is received and the terminal is in a call state, the network task continues to receive the broadcasting streaming packet data from the network while maintaining the running state, the multimedia player task is transited to the wait state, and the system call task is transited from the wait state to the running state to provide a call (communication) service to the user. The continuously received broadcasting streaming packet data begins to be temporarily stored. When the incoming call state is terminated, the system call task is transited from the running state to the wait state, and the multimedia player task is returned to the running state from the wait state to play the temporarily stored streaming packet data. In this manner, the terminal provides the broadcasting streaming service without a loss of data despite the pausing.

Thereafter, when the function (e.g., a key input) for the pause is inputted by the user, the network task is not transited to the wait state but maintains the running state, the UI task is transited from the wait state to the running state, and the multimedia player task is transited from the running state to the wait state. And then, when the function (e.g., a key input) for releasing the pause is inputted by the user, the UI task is transited from the running state to the wait state, and the multimedia player task is transited from the wait state to the running state. Thus, when an interrupt for the pause occurs, the OS in the present invention maintains the network task continuously in the running state to receive the broadcasting streaming packet data from the network and storing of the received broadcasting streaming packet data is performed, and when the pause is released, the OS plays the stored streaming packet data starting from the time point of the pause. Accordingly, even when the play is temporarily stopped, the broadcasting streaming service can be effectively provided to the user without any loss of its content.

Figure 4:
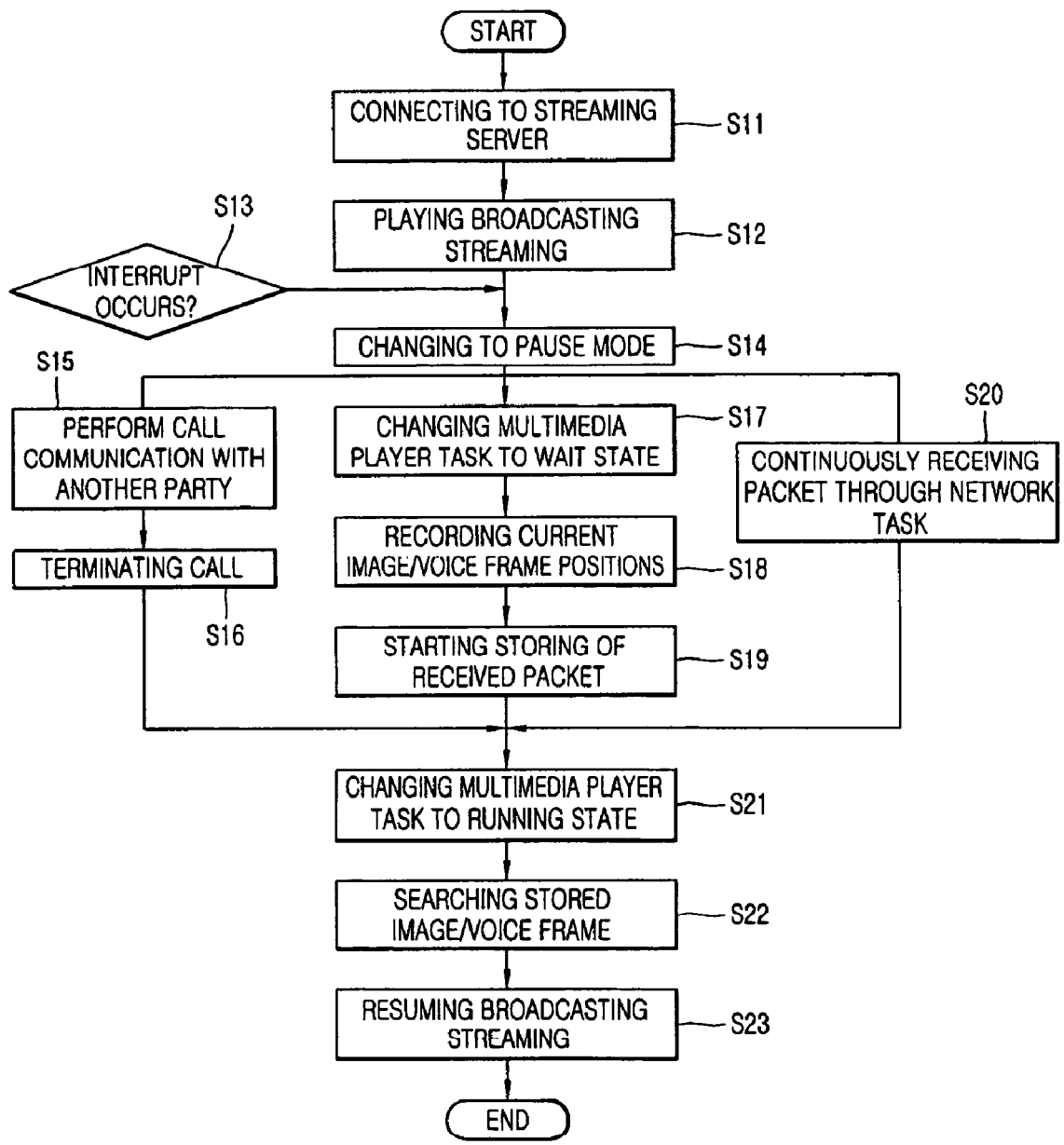
FIG. 4 is a flow chart illustrating the processes of an exemplary method for providing a pause function of a broadcasting streaming of a terminal in accordance with the present invention.
Figure 5:
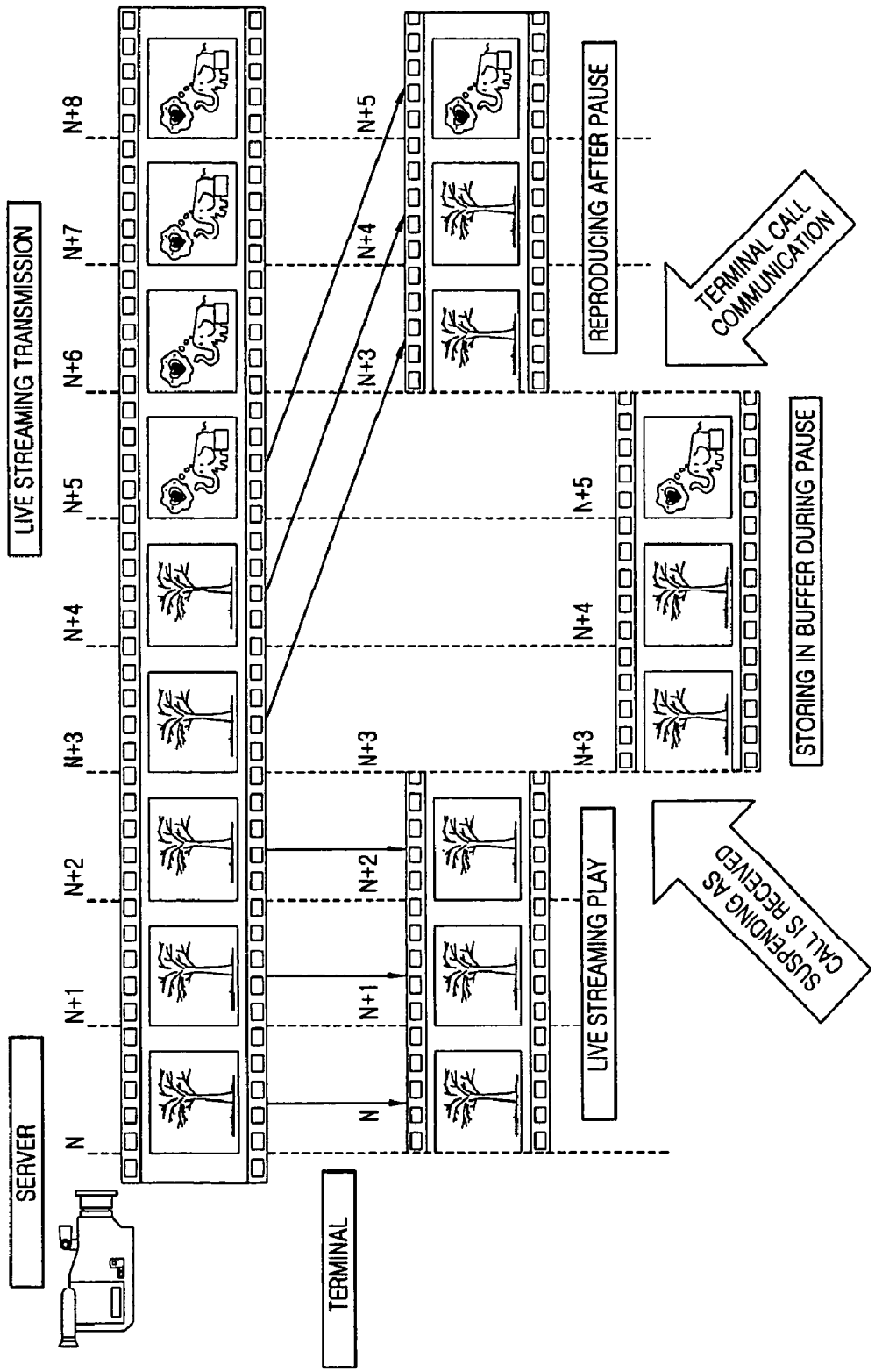
FIG. 5 is a view showing an exemplary packet data flow of the broadcasting streaming according to the pause function in accordance with the present invention.

FIG. 4 is a flow chart illustrating the processes of an exemplary method for providing a pause function of a received broadcasting streaming service of a terminal in accordance with the present invention, and FIG. 5 is a view showing an exemplary packet data flow of the broadcasting streaming service according to the pause function in accordance with the present invention.

When the terminal (or the mobile communication terminal) is connected with the streaming server and requests certain broadcasting content (such as a sports broadcast, a live news broadcast, a talk show program, etc.), the streaming server 40 transmits the requested broadcasting content to the mobile communication terminal 10 (step S11). The broadcasting content may include a live broadcast content or pre-recorded broadcast content. The streaming server may transmit the broadcasting content by using a certain transmission protocol. For example, the certain transmission protocol may comprise the RTP/RTCP protocol or any other transmission protocol.

The network interface unit 100 of the mobile communication terminal receives the broadcasting content and the player 120 plays the received broadcasting content in a streaming manner (step S12).

While the broadcasting content is being played through the player 120 of the mobile communication terminal, when the mobile communication terminal receives an incoming communication (e.g., a voice call, text or multimedia messaging, etc.) and thus a call function (e.g., talk key) is inputted through the UI interface unit 110 or when a pause function (e.g., a pause key) is inputted by the user, namely, when an interrupt for pausing the play occurs through the UI interface unit 110, the player 120 of the mobile communication terminal temporarily stops the play but continues to receive the broadcasting streaming packet data through the wireless network and stores the received broadcasting streaming packet data (steps S13~S20).

In more detail, when a call function key is inputted, the controller 121 of the player 120 changes the multimedia player task to the wait state to suspend the player 120 (step S17), records (detects) a current position of an image frame and a current position of a voice frame (step S18), continuously receives the broadcasting streaming packet data from the streaming server by maintaining the network task in the running state (step S20), and stores the received streaming packet data in the temporary storage buffer 122 (step S19). At the same time, the mobile communication terminal provides a call service (e.g., voice call connection, text or multimedia messaging function, etc.) to the user (step S15). When a pause function key is inputted, the player 120 of the mobile communication terminal performs the steps S17, S18, S20 and S19.

Thereafter, when the incoming call function or the pause function is ended (e.g., a call termination key or a pause release key is inputted), the player 120 changes the multimedia player task to the running state and searches the image frame position and the voice frame position which were recorded in the step S18 from the broadcasting streaming packet data stored in the temporary storage buffer 122 (step S22). And then, the player 120 re-starts the playback beginning from the searched image frame position and the voice frame position (step S23). Namely, the streaming player 120 performs frame decoding through the video CODEC 123 and the audio CODEC 124 starting from the searched image frame position and the voice frame position, and outputs the decoded video data and audio data respectively to the display unit 130 and the speaker 140. When the broadcasting streaming packet data is fetched from the temporary storage buffer 122, it can be immediately erased from the temporary storage buffer 122.

For example, while the mobile communication terminal is playing the broadcasting streaming content upon receiving it from the streaming server, when a pause interrupt occurs at a time point N+3, the player 120 of the mobile communication terminal suspends the playback, records a current image frame position and a current voice frame position, continuously receives the broadcasting streaming packet data from the streaming server, and stores it in the temporary storage buffer 122.

And then, when an interrupt for releasing the pause occurs at a time point N+6, the player 120 fetches the image frame position and the voice frame position stored at time of N+3 from the temporary storage buffer 122 and starts the playback. Thus, although the actual current time is N+6, the player 120 plays the broadcasting content packet data beginning from the time of N+3, such that the user effectively does not miss any portions of the broadcast that had been received during the interruption period. Thereafter, the broadcasting streaming packet data received through the network interface 100 passes through the temporary storage buffer 122 and then performs the appropriate video/audio decoding thereon.

Due to the particular characteristics of a mobile communication terminal, various aspects, such as mobility, limited processor capabilities, restricted memory size, restrictions on battery power consumption, a relatively small-sized display screen, etc., need to be considered when implementing the present invention.

For example, a small portion of the screen (or pop-up window) may be used for visually indicating that an incoming message is received, while most of the screen is used to display the broadcast streaming service. However, due to the relatively small size of the display screen, it may only be possible to display either the broadcast streaming service or the visual data related to an incoming communication on the entire screen.

Also, the temporary storage buffer (122) or other type of storage means may have a limited capacity, so thus it can be understood that the amount of video and audio data from the broadcast streaming service being stored may need to be restricted.

For instance, the buffer or storage for the mobile communication terminal may be capable of storing about 15 minutes' worth of broadcast streaming data. Thus, if the user maintains the paused or interrupted state of the playback for more than 15 minutes (or whatever the buffer or memory capacity is), then the "older" broadcast data (scenes) may need to be deleted so that "newer" broadcast data can be stored. Such deletion may be performed automatically without any user intervention, or the user may be asked whether the deletion of "older" data would be acceptable.

Alternatively, any excess broadcast data that can not be stored within the mobile communication terminal itself may be stored in an external source. This may be achieved by connecting the mobile communication terminal to an external memory via a wired or wireless interface. Here, a wired interface may be a USB cable or other data connection line, and a wireless interface may be achieved via Wi-Fi, Wi-MAX, Wi-BRO, a wireless broadband connection, or other types of technology that can handle relatively high-speed data packet transfers.

Also, instead of storing a complete full version of the streaming broadcast service data that have not been played back during the pause or interruption, such data may be stored in a compressed or abbreviated manner.

For example, commercials or advertisements in the streaming broadcast service data may be detected and not recorded (stored) in memory in order to save memory capacity. Here, it can be understood that commercials and advertisements may initially be stored, but upon detection that the memory capacity is almost full, any recorded commercials or advertisements may then be deleted.

Alternatively, the image resolution or data file size of the received streaming broadcast service may be reduced (compressed) for storage so that more content can be stored into the memory. Although the image resolution may be degraded somewhat, the user may nonetheless be satisfied that he may still view those portions of the streaming broadcast that were received during the pause or interruption duration.

Also, after the pause function has been performed at least once, if the user wishes to view the broadcast streaming service as if he is watching in real time, the broadcast streaming service may need to be continuously updated (stored and deleted) in memory. Here, there would be a time lag between the actual broadcast streaming service and what is being displayed to the user. This may be inconvenient because storing into memory would continuously need to be performed.

This time lag may be removed such that the user is provided with the actual broadcast streaming service without any delay or lag. This can be achieved is several ways. For example, all commercials within the broadcast streaming service being received and stored may be deleted from memory until the lag time due to the paused duration is eliminated. Alternatively, the user may be provided with the option of quickly passing through (i.e., "fast forward (FF)") the scenes recorded during the paused duration until the lag time is eliminated.

All of the above may be achieved by hardware, software (modules), and/or a combination thereof.

In the present description, the streaming broadcast service may be based upon digital multimedia broadcasting (DMB) technology, that includes satellite DMB and terrestrial DMB. However, it can be understood that the teachings and suggestions of the present invention are applicable to other types of broadcast signal reception techniques that have similarities with DMB technology, such as DVB-H (digital video broadcast-handheld).

It can be said that the present invention provides a communication device supporting multimedia communications and streaming broadcast signal reception, the device comprising: a communication module to send and receive information via a communications network to allow a user to communicate with other users; a streaming broadcast module to receive streaming broadcast packet data via a wireless interface; a player (or a streaming player) to perform playback of the received streaming broadcast packet data; a processor cooperating with the communication module, the streaming broadcast module, and the player, to perform the steps of, detecting an incoming communication received through the communication module while the player is performing playback of the streaming broadcast packet data being received, pausing the playback performed by the player to allow the user to handle the detected incoming communication, and resuming playback after the user has handled the detected incoming communication, by referring to the streaming broadcast packet data that was continuously received by the streaming broadcast module during the pausing of playback.

Here, the incoming communication may be a voice call, a text message, or a multimedia message. The pausing may be automatically performed without user intervention upon detecting the incoming communication or performed in accordance with specific commands received from the user. The streaming broadcast packet data received during the pausing may be stored in a memory device.

The present invention may further comprise a display means on which visual data of the streaming broadcast packet data and visual data of the incoming communication are displayed separately to respectively fill an entire screen of the display means or are displayed together on the same screen of the display means. Also, may further comprise an audio output means through which audio data of the streaming broadcast packet data and audio data of the incoming communication are outputted separately or together.

As so far described, the apparatus and method for providing the pause function of broadcasting streaming of the mobile communication terminal have many advantages.

That is, first, when an interrupt for pausing a broadcasting streaming service being received occurs, the network task is continuously maintained in the running state, so that the broadcasting streaming packet data can be continuously received from the network during the pause of the streaming service.

Second, by providing the temporary storage buffer, the broadcasting streaming packet data is continuously received from the network and temporarily stored in the temporary storage buffer during the pause of the play, such that a loss of content of the broadcasting streaming during the pause term can be minimized or effectively prevented.

Third, the broadcasting streaming packet data is continuously received from the network and temporarily stored during the pause of the play, and when the pause is released, video decoding and audio decoding are performed starting from an image frame position and a voice frame position of the time point of the pause. Thus, the pause function is additionally provided to the broadcasting streaming service of the mobile communication terminal.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for providing a pause function of a broadcasting streaming service of a terminal, comprising:
   reproducing received streamed packet data of broadcasting content;
   suspending the reproducing responsive to an input to a pause key;
   continuing to receive, after the suspending has been initiated, the streamed packet data of broadcasting content from a server, wherein the streamed packet data that is received after the suspending has been initiated is not reproduced as it is received;
   temporarily storing the received streamed packet data of broadcasting content that was received after the suspending has been initiated in a memory device;
   fetching second data from the memory device, the second data being the temporarily stored streamed packet data of broadcasting content starting from the point of time of the suspending;
   performing a second reproducing, if the memory device has not reached a storage capacity, of the fetched temporarily stored streamed packet data of broadcasting content starting from the point of time of the suspending responsive to an input to a pause release key that is different from the pause key;
   deleting, if the memory device has reached the storage capacity, oldest portions of the temporarily stored streamed packet data, wherein the deleting permits the temporarily storing of the received streamed packet data, and wherein the deleting occurs while the suspending occurs;
   fetching third data from the memory device, the third data being the temporarily stored streamed packet data of broadcasting content starting from a point of time that relates to an oldest portion of the temporarily stored streamed packet data that has not been deleted;
   performing a third reproducing, if the memory device has reached the storage capacity, of the fetched temporarily stored streamed packet data of broadcasting content starting from the point of time that relates to an oldest portion of the temporarily stored streamed packet data that has not been deleted, wherein the third reproducing is performed responsive to the user input to the pause release key;
   erasing the second data from the memory device after the fetching of the second data from the memory device; and
   erasing the third data from the memory device after the fetching of the third data from the memory device;
   wherein a first task is associated with the pause key when the pause key also functions as a call key for performing a call service such that the input to the pause key further functions to perform the call service, and
   wherein a second task is associated with the pause key when the pause key also functions as a specific key for performing a user interface task such that the input to the pause key further functions to perform the user interface task.

2. The method of claim 1, wherein the streamed packet data of broadcasting content comprises current image frame position and voice frame position.

3. The method of claim 1, wherein the streamed packet data of broadcasting content comprises packet data for at least one of live content or packet data for prerecorded broadcasting content.

4. The method of claim 1, wherein a reproducing rate of the streamed packet data of broadcasting content cannot be controlled by a user.

5. The method of claim 1, wherein an operating system of the terminal changes a task for processing the input to the pause key from a wait state to a running state, changes a multimedia player task from a running state to a wait state in order to perform the suspending, maintains a network task in a running state in order to receive the streamed packet data of broadcast content received from the server, and temporarily stores the streamed packet data of broadcast content, responsive to the input to the pause key.

6. The method of claim 1, responsive to the input to the pause release key, an operating system of the terminal changes a task for processing the input to the pause release key from a running state to a wait state, and changes the multimedia player task from the wait state to the running state in order to resume the second reproducing of the temporarily stored streamed packet data of broadcasting content from a time point of the input to the pause key.

7. The method of claim 6, wherein the task for processing the input to the pause release key indicates a system call task if the pause release key is a call termination key, and wherein if the pause release key is a specific key for releasing the pause, then the task for processing the input to the pause release key indicates a user interface task.

8. The method of claim 1, wherein the pause key comprises a call key for receiving an incoming call to the terminal.

9. The method of claim 1, wherein the received streamed packet data of broadcasting content comprises packet data of live content.

10. The method of claim 1, further comprising:
sending and receiving information to another party via a communications network.

11. The method of claim 1, further comprising:
detecting an incoming communication prior to the suspending and during the reproducing of the received streamed packet data, wherein the incoming communication is either a voice call or a text message.

12. The method of claim 1, further comprising:
prior to the suspending, detecting an incoming communication during the reproducing of the received streamed packet data;
reproducing information related to the incoming communication on a display associated with the terminal; and
reproducing the received streamed packet data of broadcasting content on the display simultaneously with the reproducing of the information.

13. The method of claim 1, wherein the temporarily storing the received streamed packet data comprises:
detecting commercials or advertisements contained in the received streamed packet data; and
omitting the detected commercials or advertisements of the streamed packet data before such data is temporarily stored.

14. The method of claim 1, further comprising:
deleting commercials or advertisements of the streamed packet data which has been temporarily stored such that the commercials or advertisements are not reproduced.

15. The method of claim 1, further comprising:
deleting commercials or advertisements of the streamed packet data which has been temporarily stored if the memory device has reached the storage capacity.

16. An apparatus for providing a pause function of a broadcasting streaming service, the apparatus comprising:
a network interface unit configured to receive streamed packet data of broadcasting content;
a player configured to reproduce the received streamed packet data of broadcasting content;
a pause key configured to cause suspending of the reproducing of the received streamed packet data responsive to input to the pause key, wherein the network interface unit continues to receive the streamed packet data after the suspending is initiated, and wherein the streamed packet data that is received after the suspending has been initiated is not reproduced by the player as it is received;
a pause release key which is different from the pause key;
a memory device configured to temporarily store the streamed packet data of broadcasting content and delete, if the memory device has reached a storage capacity, oldest portions of the temporarily stored streamed packet data, wherein the deleting permits the temporarily storing of the received streamed packet data and occurs while the suspending occurs;
wherein the player is further configured to cause fetching of second data from the memory device, the second data being the temporarily stored streamed packet data of broadcasting content starting from a point of time that relates to an oldest portion of the temporarily stored streamed packet data that has not been deleted, wherein the second data is erased from the memory device after the fetching of the second data from the memory device;
wherein the player is further configured to perform a second reproducing of the fetched second data responsive to input to the pause release key, the second reproducing occurring if the memory device has reached the storage capacity, wherein the second reproducing of the fetched second data starts from the point of time that relates to the oldest portion of the temporarily stored streamed packet data that has not been deleted;
wherein the player is further configured to fetch third data from the memory device, the third data being the temporarily stored streamed packet data of broadcasting content starting from a point of time of the suspending, wherein the third data is erased from the memory device after the fetching of the third data from the memory device; and
wherein the player is further configured to perform a third reproducing of the fetched third data responsive to the input to the pause release key, the third reproducing occurring if the memory device has not reached the storage capacity, wherein the third reproducing of the temporarily stored streamed packet data starts from the point of time of the suspending;
wherein a first task is associated with the pause key when the pause key also functions as a call key for performing a call service such that the input to the pause key further functions to perform the call service, and
wherein a second task is associated with the pause key when the pause key also functions as a specific key for performing a user interface task such that the input to the pause key further functions to perform the user interface task.

17. The apparatus of claim 16, wherein the player comprises:
a controller for controlling the second reproducing and the third reproducing and for controlling the suspending.

18. The apparatus of claim 17, further comprising:
a video CODEC for decoding video data of the streamed packet data of broadcasting content under control of the controller; and
an audio CODEC for decoding audio data of the streamed packet data of broadcasting content under control of the controller.

19. The apparatus of claim 16, wherein the controller controls an Operating System (OS) to maintain a network task in a running state and change a multimedia player task from a running state to a wait state if an interrupt for the suspending occurs.

20. The apparatus of claim 19, wherein the OS maintains the network task in the running state and changes the multimedia player task from the wait state to the running state if a pause release interrupt occurs.

21. The apparatus of claim 16, further comprising:
a display unit for displaying decoded video data of the streamed packet data of broadcasting content under control of the player; and
a speaker for outputting decoded audio data of the streamed packet data of broadcasting content under control of the player.

22. A method for providing a pause function of a broadcasting streaming service of a terminal, comprising:
performing a first reproducing of received streamed packet data of broadcasting content;
suspending the first reproducing responsive to input to a pause key;
continuing to receive, after the suspending has been initiated, the streamed packet data of broadcasting content from a server, wherein the streamed packet data that is received after the suspending has been initiated is not reproduced as it is received;
temporarily storing the received streamed packet data of broadcasting content that was received after the suspending has been initiated in a memory device;
fetching the temporarily stored streamed packet data of broadcasting content from the memory device and erasing the temporarily stored streamed packet data of broadcasting content from the memory device after the fetching;
performing a second reproducing of the fetched temporarily stored streamed packet data of broadcasting content starting from the point of time of the suspending responsive to input to a pause release key that is different from the pause key; and
wherein a reproducing rate of the first reproducing and the second reproducing cannot be controlled by a user;
prior to the suspending, detecting an incoming communication during the first reproducing of the received streamed packet data;
reproducing information related to the incoming communication on a display associated with the terminal; and
performing the first reproducing of the received streamed packet data of broadcasting content on the display simultaneously with the reproducing of the information.

23. The method of claim 22, wherein the received streamed packet data of broadcasting content comprises packet data of live content.

24. The method of claim 22, further comprising:
sending and receiving information to another party via a communications network.

25. The method of claim 22, further comprising:
detecting an incoming communication prior to the suspending and during the first reproducing of the received streamed packet data, wherein the incoming communication is either a voice call or a text message.

26. The method of claim 22, wherein the temporarily storing the received streamed packet data comprises:
detecting commercials or advertisements contained in the received streamed packet data; and
omitting the detected commercials or advertisements of the streamed packet data before such data is temporarily stored.

27. The method of claim 22, further comprising:
deleting commercials or advertisements of the streamed packet data which has been temporarily stored such that the commercials or advertisements are not reproduced.

28. The method of claim 22, further comprising:
deleting commercials or advertisements of the streamed packet data which has been temporarily stored if the memory device has reached the storage capacity.

29. An apparatus for providing a pause function of a broadcasting streaming service, comprising:
a network interface configured to receive streamed packet data of broadcasting content;
a player configured to reproduce the received streamed packet data of broadcasting content;
a call key configured to initiate a call function for the apparatus responsive to user input;
a pause key configured to cause suspending of the reproducing of the received streamed packet data responsive to input to a pause key, wherein the network interface unit continues to receive the streamed packet data after the suspending is initiated, and wherein the streamed packet data that is received after the suspending has been initiated is not reproduced by the player as it is received;
a pause release key which is different from the pause key;
a memory device configured to temporarily store the streamed packet data of broadcasting content;
wherein the player is further configured to cause fetching of the temporarily stored streamed packet data of broadcasting content from the memory device and to reproduce the fetched temporarily stored streamed packet data of broadcasting content starting from the point of time of the suspending responsive to input to the pause release key;
wherein the temporarily stored streamed packet data of broadcasting content is erased from the memory device after the fetching of the temporarily stored streamed packet data, and wherein a reproducing rate of the streamed packet data of broadcasting content cannot be controlled by a user;
prior to the suspending, detecting an incoming communication during the first reproducing of the received streamed packet data;
reproducing information related to the incoming communication on a display associated with the terminal; and
performing the first reproducing of the received streamed packet data of broadcasting content on the display simultaneously with the reproducing of the information.

* * * * *